Sept. 29, 1964        L. H. BARRON        3,150,470

DIAMOND COATED WIRE SAW

Filed Aug. 11, 1961

INVENTOR
LEE H. BARRON
BY

ATTORNEY

United States Patent Office 3,150,470
Patented Sept. 29, 1964

3,150,470
DIAMOND COATED WIRE SAW
Lee H. Barron, 612 W. Elk Ave., Glendale, Calif.
Filed Aug. 11, 1961, Ser. No. 130,974
7 Claims. (Cl. 51—185)

This invention relates to a diamond coated braided wire saw.

Diamond coated wire saws have been heretofore made using as a base a single steel wire. Uncoated wire saws, used in conjunction with loose abrasive grits, have also been used in which the "wire" was a twisted strand of steel wires. In general, my improved wire saw comprises a multiple wire braid on the surface of which diamond grits are securely attached to the outer wire surfaces by an electroplate of nickel, with or without relief areas.

The principal object of the invention is to provide a very flexible diamond coated wire saw for cut-off or scroll cutting of extremely hard and tough materials such as composition blocks and sheets composed of a cured cement or synthetic plastic binder with a granular or fibrous filler materials, and solid pieces of glass, ceramics, and other inorganic compositions, such as silicon carbide, silicon nitride, and the like, which materials can be cut only by means of diamond coated coated tools.

Another object is to provide a flexible braid of beryllium-cobalt-copper alloy wires for supporting a nickel bonded diamond grit coating for an endless band saw.

A preferred form of my invention is shown in the drawing, in which

Figure 1:
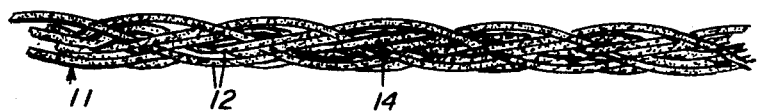
FIG. 1 is a plan view of a braid of wires coated with diamond grits.
Figure 2:
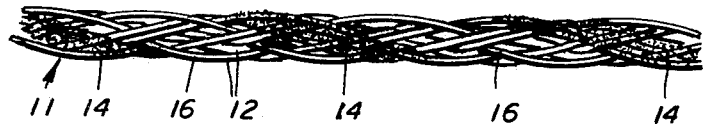
FIG. 2 is a plan view of a braid of wires coated with diamond grits held in place by an electroplate of nickel, showing a spiral relief band having no diamond grits.
Figure 3:
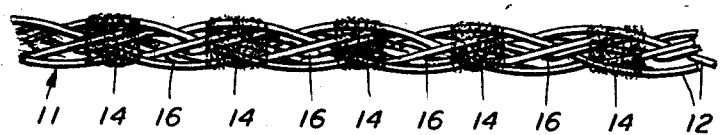
FIG. 3 is an elevational view of a diamond coated braid with circular relief bands.
Figure 4:
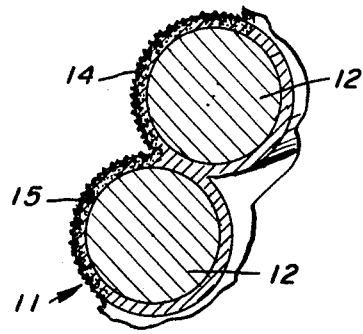
FIG. 4 is a fragmentary cross-sectional view showing the coatings on two contacting wires on the outer surface of the braid.

Referring to the drawings, a solid round braid 11 of eight wire strands 12, is provided as the flexible base for a diamond-coated "wire" saw, the diamond grits 14 being attached to the outer surfaces of the braid by an electroplate of nickel 15. A relief strip 16, for example, spiral in pattern, is provided, on which no diamond grits are attached to the braid. An overcoating of electrodeposited nickel may be provided over the diamonds and over the surface of the relief strip 16. Where the wires in the braid are in contact, the nickel coating binds them together.

The spiral relief strip 16 may be of any desired width or of any selected pitch, or it may be a succession of circular bands around the braid, this making a segmental coating of the diamond grits interrupted by uncoated segments. The function of the relief bands is to provide means for carrying cutting fluid to the diamond cutting points and edges and to provide for the removal of the abraded material from the kerf cut by the wire saw.

In the drawings there is shown as an example an eight wire braid, but it is contemplated that any selected number of wires may be formed into a braid and the wires may be of any selected diameter. The braid is of a non-extensible kind.

In making my diamond coated wire saw, the wire braid was formed, and then cleaned in the usual manner for electroplating, and a narrow strip of pressure adhesive masking tape was applied to the braid in a spiral at the desired pitch, for forming a relief groove or pattern.

A length of braid was then placed on an insulating support, the braid between the end electrical connections being embedded within a compact mass of diamond grits. Nickel was then electro-deposited on the un-masked portion of the braid, embedded in the compact mass of diamond grits, by immersing the assembly in an electroplating nickel bath, with the metallic braid as the cathode. An electroplating bath for nickel may, for example, be the wellknown "Watts" solution (containing 10 pounds of nickel sulfate, 1 pound 14½ ounces of nickel chloride, and 1 pound 4 ounces of boric acid, dissolved in 5 gallons of distilled water). The nickel plating operation was continued until a nickel bonded diamond coating of the desired thickness, for example, about 0.010 inch, was formed. The coating length of braid was then separated from the excess diamonds, the masking strip peeled off, and the entire surface, including the masked-off relief groove area, was given an electroplate of nickel of about .002 inch in thickness. The nickel cover coat improves the attachment of the diamond grits, and also provides a hardened metal surface to the uncoated relief groove area of the wire braid, because the electroplate of nickel is harder and more resistant to abrasion than is beryllium-cobalt-copper alloy.

As before indicated, the braid for the diamond coated wire saw is made from a plurality of wires of beryllium-cobalt-copper alloy, commonly called beryllium-copper. The preferred alloy contains 1.80 to 2.05 percent beryllium, 0.18 to 0.30 percent cobalt, and the balance copper. The alloy is drawn into wires by the usual process, and is preferably "half hardened" (about Rockwell B88–96) prior to the diamond coating. Other beryllium-cobalt-copper alloys of slightly different composition may also be used.

After attaching the diamond coating to the desired length of braid of beryllium-copper wires by electroplating as described, the coated braided wires were tempered to spring temper (about Rockwell C–40) by heating the length of coated braid to about 700° F. for one-half hour, and then air cooling. The diamond coated braid becomes softer from repeated flexing in use on a wire saw machine, and may be re-tempered if desired.

The ends of the coated braid may be joined into a continuous braid, or short bands may be joined together by means of a joint made with slightly overlapped individual wires held together by silver solder.

Actual tests of my new wire saw with diamond coatings have proven that it is highly effective, and has a much longer life than diamond coated steel wire saws.

I claim:

1. A wire saw comprising in combination
   (a) a braid of a plurality of beryllium-cobalt-copper alloy wires and
   (b) a coating of abrasive grits attached to the outer surface only of said braid.

2. A wire saw comprising in combination
   (a) a braid of a plurality of beryllium-cobalt-copper alloy wires and
   (b) a coating of diamond grits attached to the outer surface only of said braid by an electroplate of nickel.

3. A wire saw comprising in combination
   (a) a braid of a plurality of beryllium-cobalt-copper alloy wires and
   (b) a coating of diamond grits attached to the outer surface only of said braid by an electroplate of nickel, said coating being applied in an interrupted pattern, the contiguous margins of which define relief areas between the diamond coated areas.

4. A wire saw comprising in combination (a) a braid of a plurality of beryllium-cobalt-copper alloy wires, (b) a coating of diamond grits attached to said braid by an electroplate of nickel, said coating being applied in an interrupted pattern, the contiguous margins of which define relief areas between the diamond coated areas, and (c) a cover coat of electroplated nickel over the diamond coated areas and the relief areas.

5. A wire saw as defined in claim 4 in which the diamond coated areas are spiral bands.

6. A wire saw as defined in claim 4 in which the diamond coated areas are circular bands.

7. A wire saw as claimed in claim 4 in which the alloy is composed of at least 97.65 percent copper.

References Cited in the file of this patent

UNITED STATES PATENTS

| | | |
|---|---|---|
| 2,714,790 | Lindenborg | Aug. 9, 1955 |
| 2,924,050 | Barron | Feb. 9, 1960 |

FOREIGN PATENTS

| | | |
|---|---|---|
| 13,417 | Great Britain | July 25, 1900 |
| 18,553 | Switzerland | Jan. 20, 1899 |
| 1,045,307 | Germany | Nov. 27, 1958 |

OTHER REFERENCES

The Role of Beryllium Copper as an Engineering Material, M. J. Donachie-Paper presented before the Non-Ferrous Metallurgical Committee General Motors Corp., Detroit, Michigan, Sept. 13, 1944. Copy available in Class 75 subclass 153.